UNITED STATES PATENT OFFICE.

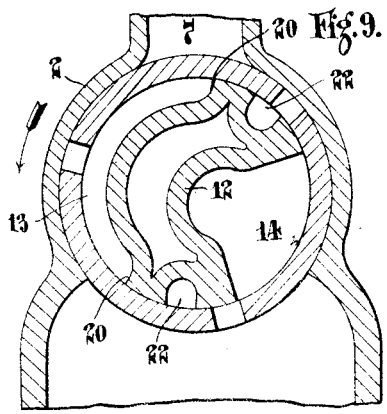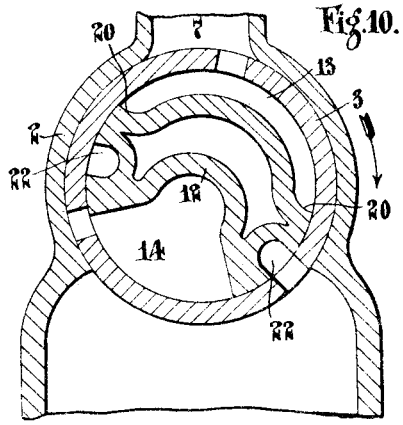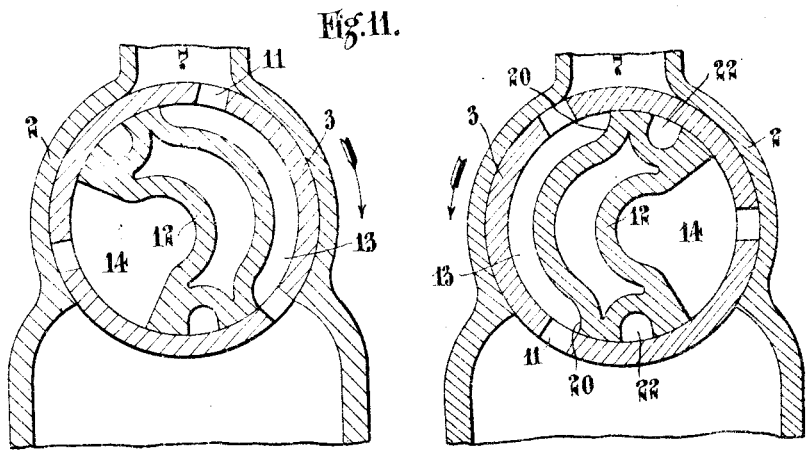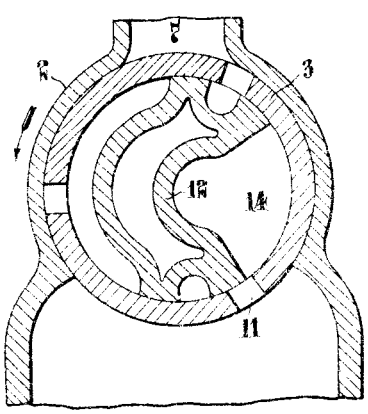

JOSEPH ROTHCHILD, OF BROOKLYN, NEW YORK, AND JOHN BAXTER JARVIS, OF LONDON, ENGLAND, ASSIGNORS TO JARVIS ENGINEERING CO. LIMITED, OF WESTMINSTER, LONDON, ENGLAND.

INTERNAL-COMBUSTION ENGINE.

1,117,095.   Specification of Letters Patent.   Patented Nov. 10, 1914.

Application filed December 26, 1912. Serial No. 738,714.

*To all whom it may concern:*

Be it known that we, JOSEPH ROTHCHILD, a citizen of the United States of America, and residing at 295 Stuyvesant avenue, Brooklyn, New York, formerly at Queen Anne's Chambers, Westminster, in the county of London, England, and JOHN BAXTER JARVIS, a subject of the King of Great Britain and Ireland, and residing at 44ª Holland road, in the county of London, England, have invented certain new and useful Improvements in Internal-Combustion Engines, of which the following is a specification.

This invention relates to engines comprising a cylinder, a housing thereon, in the housing a main valve maintained in continuous rotation by the engine when running and an adjustable controlling valve mounted within the main valve.

The main object of the invention is to provide an engine of the type referred to adapted to operate as an internal combustion engine.

A further object of the invention is to provide such an internal combustion in which the main valve and the control valve together control all the operations necessary for the starting and the normal running of the engine in either direction.

The invention consists broadly in an internal combustion engine comprising a cylinder, a housing thereon, in the housing a main valve maintained in continuous rotation by the engine when running, an adjustable control valve mounted within the main valve and means for pressing the said valves on their respective seats.

The invention further consists in an internal combustion engine comprising a cylinder, a housing thereon, in the housing a main valve maintained in continuous rotation when the engine is running and an adjustable controlling valve mounted within the main valve and means for adjusting the controlling valve into a number of positions in certain of which positions compressed fluid is admitted to the cylinder for starting while in other positions explosive mixture is admitted to the cylinder for normal running.

Reference will now be made to the accompanying drawings which are illustrative of one convenient manner in which the present invention may be carried into effect, like characters of reference indicating like parts, and in which—

Figure 1:
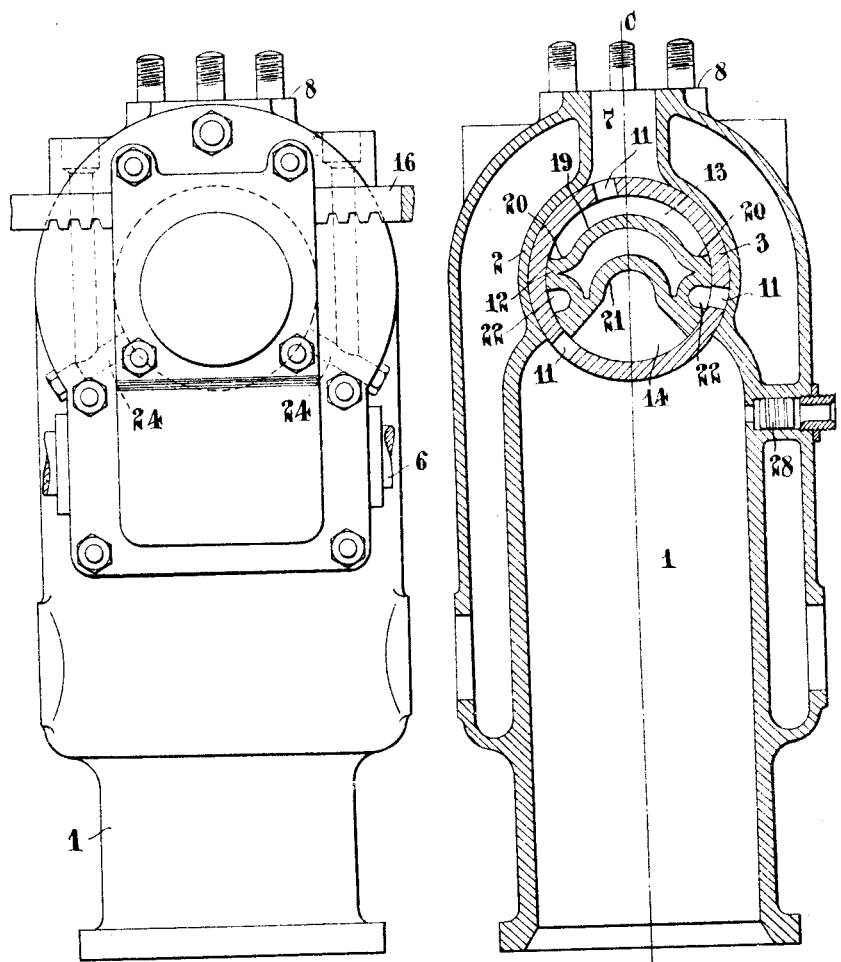
Figure 2:
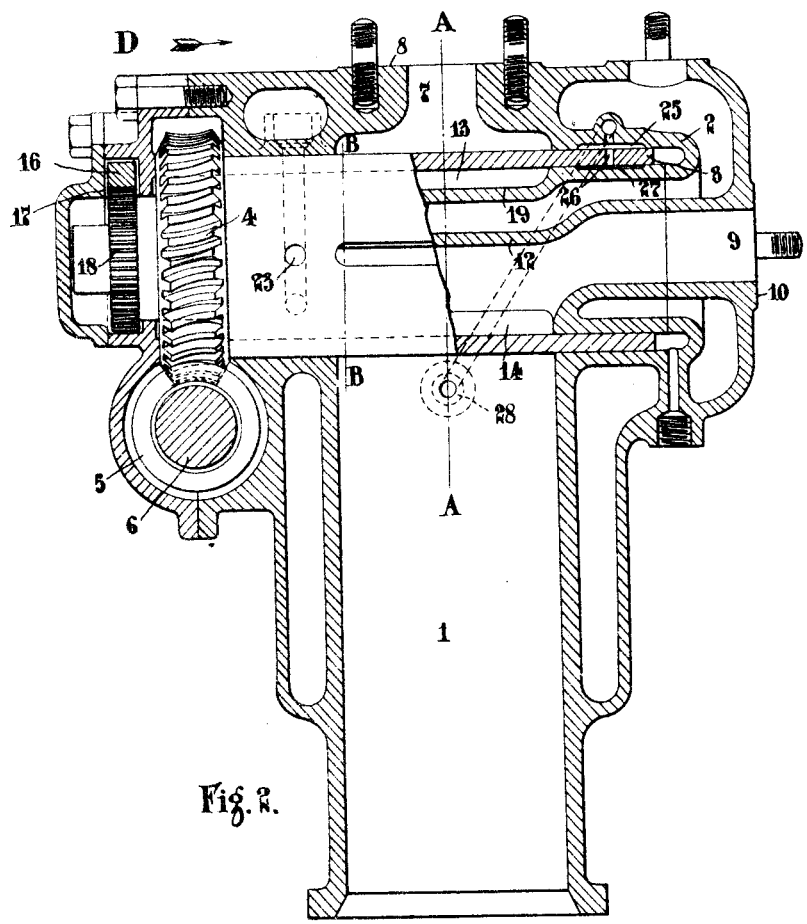
Figure 4:
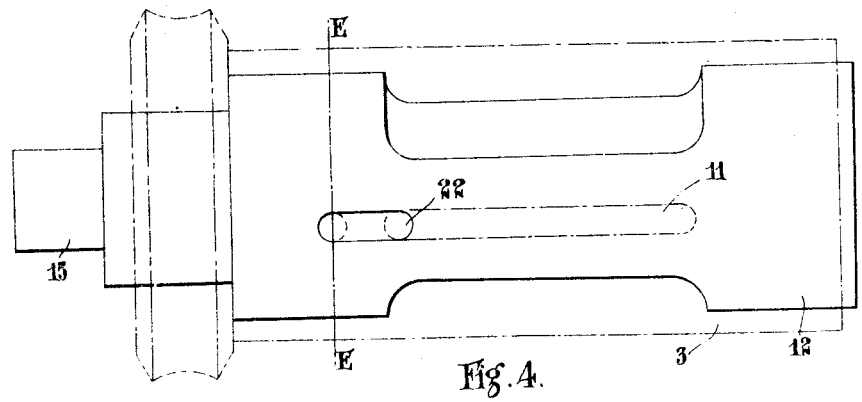
Figure 6:
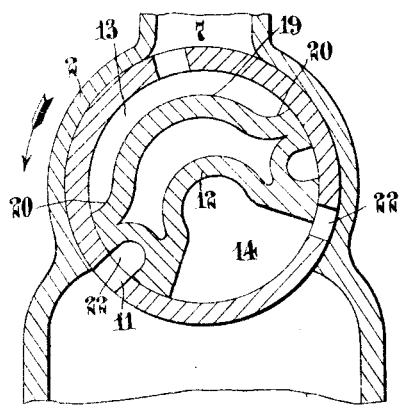
Figure 5:
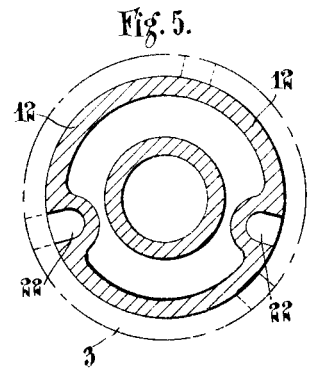
Figure 7:
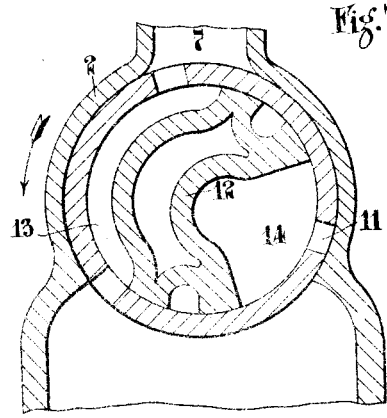
Figure 8:
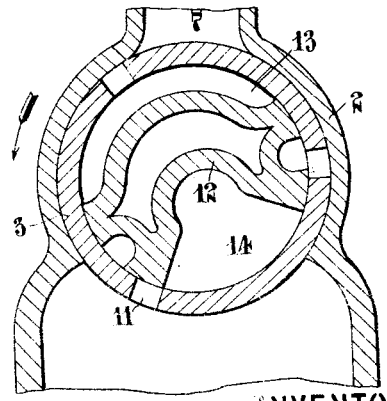

Figure 1 is a sectional elevation on the line A B B A of Fig. 2 and shows the adjusting valve in such a position that no motive fluid whatever is capable of passing into the engine cylinder. Fig. 2 is a sectional elevation taken on the line C C of Fig. 1, part of the main valve being shown complete for the purpose of showing certain ports. Fig. 3 is an outside elevation of our improved engine looking in the direction of the arrow D. Fig. 4 is an outside elevation of the adjusting valve, the main valve being shown in dotted lines for the purpose of showing the relation of the adjusting valve to the main valve. Fig. 5 is a sectional view of the adjusting valve taken on the line E E of Fig. 4. Figs. 6–13 inclusive are part sections taken on the line A B B A of Fig. 2 to show the adjusting valve and the main valve in various relative positions. Fig. 6 shows the adjusting valve and the main valve in such relative positions as to allow a charge of compressed motive fluid to be passed into the engine cylinder. Fig. 7 shows the adjusting valve turned to another position wherein the supply of compressed motive fluid used for starting up is discontinued while at the same time the charge of combustible mixture is allowed to pass into the engine cylinder. Fig. 8 shows the adjusting valve in the same relative position as in Fig. 6, namely, the starting up position, but the main valve is shown turned to a new position with respect to the adjusting valve and the exhaust of the starting up charge is just about to commence. Fig. 9 shows the adjusting valve turned to the normal working position as shown in Fig. 7, the main valve now being turned to such a position as to permit of the cylinder products being exhausted. Fig. 10 shows the adjusting valve placed into such a position within the main valve as to permit a charge of compressed motive fluid being passed into the engine cylinder so as to cause the engine to turn in the reverse direction. Fig. 11 is a view similar to Fig. 7, the adjusting valve being adjusted to permit of the engine running in the reverse direction. Figs. 12 and 13 are views showing how the main valve may be used as the cut-off valve while the adjusting valve is used to determine the point of the exhaust.

In carrying the present invention into effect in the preferred manner, at the upper end of the cylinder 1 we provide a housing 2 the cylinder and housing being water jacketed as illustrated in Figs. 1 and 2.

3 indicates the main valve which is preferably cylindrical in form and it is mounted within the said housing 2 and adapted to be continuously rotated, while the engine is running, by any suitable means. As shown in Fig. 2, one end of the main valve 3 may conveniently be carried through the end of the housing 2 and have secured thereon a worm wheel 4 which is arranged to be in mesh with a worm 5 carried upon a spindle 6 which is mounted in suitable bearings and is driven in any suitable manner from the crank shaft of the engine or any other revolving part. Of course in place of the worm wheel 4 we may, if we so desire, provide a pinion secured upon the end of the main valve for the purpose of rotating the same, and in such a case the said pinion would be driven by suitable gearing.

It is to be pointed out that we do not intend the above to indicate the only arrangement we may adopt by which to rotate the main valve 3, for we may, if we so desire, instead of allowing one end of the main valve 3 to project through the end of the housing 2, arrange a shaft fixed to the said valve 3, and allow such shaft to project through the end of the housing and provide on this shaft suitable means by which the valve 3 may be rotated.

7 is a passageway arranged in the housing 2, by means of which the supply of combustible mixture is conducted from the induction pipe to the main valve 3, the said induction pipe being secured to the housing by a flange which is secured in position on the facing 8 by suitable means. 9 is a passageway provided in the housing, by means of which the exhaust gases are conducted away from the engine, 10 being the facing against which the flange of the exhaust pipe may be conveniently secured. Also if we so desire we may provide suitable and well-known means by the aid of which the main valve 3 is kept in place within the housing 2 and these means, if desirable may be made resilient as by the use of a spring. Such a provision as this, being of a well-known character, is not illustrated.

Within the valve 3 we locate a member 12 which member is adapted to be rotated as desired for the purpose of admitting motive fluid from the space 13 formed as hereinafter described between the valve 3 and the valve 12, to the engine cylinder or for enabling exhaust gases to pass from the engine cylinder into the space 14 also formed between the valve member 3 and the valve member 12 and from thence to the exhaust passageway 9 previously mentioned. This member which we locate within the cylindrical valve, we prefer to call the controller or adjuster.

Referring now more particularly to the cylindrical valve member 3 we preferably provide it with a plurality of slots or ports 11 arranged in its periphery and these slots are of sufficient length and breadth as to allow of the necessary quantity of mixture passing into the engine cylinder at the desired speed, and the arrangement of the slots is such that when one slot is in communication with the passageway 7 through which motive fluid is led up to the valve member 3, another of the said slots 11 is in such a position as to allow a flow of gas to take place from the interior of the cylindrical valve member 3 into the engine cylinder. Further as will be seen this cylindrical member 3 will be acted upon by the pressure of the gas within the engine cylinder and we preferably arrange means by which the said cylindrical member is always kept down on its seat and in the region of the part communicating with the engine cylinder. The precise manner in which this is effected will be described hereafter. Again, if we so prefer, we may provide a plurality of circumferential grooves on the cylindrical member, each of these grooves being adapted to contain a suitable packing ring by means of which leakage along the outer periphery of the cylindrical valve member and the sides of the housing in which it is located, is prevented, and since this particular method of preventing leakage is so well-known, it has not been thought necessary to illustrate it in the drawings.

The controller 12 above mentioned we prefer to make cylindrical in form and one end 15 is adapted to pass through the outer end of the valve 3 and to be operated by means of a suitable handle for the purpose of rotating the controller within the cylindrical valve member to any desired position. In the accompanying drawings we have shown the adjuster or controller 12, as being operated by means of a rack 16 suitably supported and operated within guides 17, and being in engagement with a pinion 18 secured upon the end 15 of the adjuster so that an adjustment of the rack will serve to rotate the valve 12, but any other well-known means may be adopted for bringing about the necessary rotation. On the surface of this controller we provide a plurality of recesses. The recess 19 serves to provide a space 13 between the inner surface of the valve 3 and the outer surface of the valve 12 and through this space the charge of combustible mixture is adapted to pass. This recess 19 is of such a length circumferentially as to allow, when the controller is in one position within the cylindrical valve member and the latter is in such a position that one of its ports 11 is in communication with the passageway 7 while another port 11 is in communication with the interior of the engine cylinder, that the motive fluid which thereby flows through into the interior of the cylindrical valve is adapted to pass over one edge 20 of this recess in the controller 12 into the cylinder. Opposite to this recess 19 we provide a second recess 21 which also extends for a large distance around the periphery of the controller thereby providing between the inner surface of the valve 3 and the surface of the controller 12, the space 14 previously mentioned, which space is of such dimensions that when the valve 3 assumes another position, viz: the position whereby the exhaust gases can be passed from the engine cylinder into the interior of the valve member 3, such gases pass into the space 14 provided by the recess 21 and from there are led away into the exhaust passage 9 which we provide in the housing. In that part of the periphery of the controller which connects the adjacent edges of the two recesses 19 and 21 we also preferably provide two recesses 22 for the purpose of admitting a charge of fluid pressure into the engine cylinder, see Figs. 4 and 5. We also provide in the shell of the cylindrical valve 3 suitable slots or holes 23 each of which is adapted to register with a passageway 24 provided in the housing and adapted to be used for the passage of fluid pressure. These holes 23 are so arranged that, when the controller is placed in a certain position within the cylindrical valve, such a position being indicated in Fig. 6 for one direction of rotation of the engine, and in Fig. 10 for the reverse direction of rotation, one of the said recesses 22 also registers with one of these holes 23 and also with one of the previously mentioned slots 11 which are provided for the passage of motive fluid to the engine cylinder. It will thus be seen that if the engine is at rest, it is only necessary to adjust the controller to such a position as shown in Fig. 6 when, if one of the fluid admission ports 11, registers with the inlet opening to the cylinder, a charge of fluid pressure will pass through the passageway 24, hole 23, one of the recesses 22 and through one of the ports 11 into the engine cylinder. These slots or holes 23 are so positioned that during the period of starting up only two strokes are used for a complete cycle, i. e. during the first stroke a charge of fluid pressure passes into the cylinder, thereby causing the piston to move forward and so turn the crank shaft and rotate the main valve relatively to the walls of the housing and to the controller, the arrangement being such that at the end of the forward stroke the same port which allows compressed air to flow into the cylinder is now placed into communication with the exhaust recess formed in the controller, so that on the return stroke the air is exhausted from the cylinder. By this means it will be seen that the engine can be given a number of impulses and that practically no back pressure is exerted on the piston during this starting up period.

As soon as the engine has got up a certain amount of speed the controller 12 can be moved to the working position as indicated in Fig. 7, for one direction of rotation, and in Fig. 11 for the reverse direction of rotation, and in such position it is only possible for the air and gas mixture to enter into the cylinder. Fluid pressure cannot enter as now the recess 22 provided in the controller for the passage of such is not registering with the fluid pressure passageway 24 provided in the housing. Moreover on the continued rotation of the cylindrical valve 3, one of the slots 11 arranged in the periphery thereof will register with the fluid pressure passageway 22 of the controller but gas cannot pass from the engine cylinder since there is no outlet from such passageway through the shell of the cylindrical valve member, and as above stated the construction and arrangement of the controller is such as to allow the engine to run on its ordinary cycle.

We may provide any number of ports 11 adapted to pass explosive mixture into the engine cylinder but it is to be noted, that when the engine is arranged to run on the four stroke cycle, the cylindrical valve member must make one complete rotation while the crank-shaft rotates a number of times equal to twice the number of ports in the valve, i. e., if three admission ports are provided, then the cylindrical valve would rotate at one sixth of the angular velocity of the crank shaft.

By providing a recess 22 for the passage of compressed air on each side of the controller 12, this controller can be adapted to start up the engine in one or the reverse direction, and of course if such be the case it will also be necessary to provide a corresponding slot 23 in the shell of the cylindrical valve member 3, such slot being so placed as to provide communication between the corresponding recess 22 in the controller 12 and the fluid pressure passageway. It will thus be seen that by simply placing the controller in a succession of various positions, the engine may first of all be started up and after adapted to run in either direction of rotation on its ordinary cycle. Furthermore, we preferably so arrange all the recesses on the periphery of the controller that when the latter is adjusted to a certain position within the cylindrical valve, neither explosive mixture nor compressed air can pass into the cylinder of the engine.

As previously stated, the pressure of the gas in the cylinder acts on that portion of the periphery of the cylindrical valve 3 which is in the way of the port leading to the cylinder. Owing to the pressure in the cylinder being variable, there is a variable force tending to force the said valve away from that side of the housing adjacent such opening and means are provided whereby we insure that the said cylindrical valve is always kept down on the said side of the housing. In order to effect this we preferably provide on the opposite side of the housing one or more recesses into which oil or other liquid substance is forced from a suitable receptacle, and the pressure acting on the oil may be either a constant pressure or we may arrange that the pressure on the oil may be a variable pressure which is communicated to the oil receptacle by means of a suitable pipe connected to the cylinder. By this arrangement it will be seen that the pressure on the oil is always the same as that in the cylinder. If we so desire we may, however, arrange that the pressure of the gas in one cylinder be utilized to act on the oil to force into position the cylindrical valve of another cylinder and this provision we make in view of the fact that there may be a certain amount of "lag" of the transference of the pressure from the cylinder to the oil receptacle.

We preferably make the total area of the recess or recesses which we provide in the walls of the housing as stated above, in excess of that of the part of the cylindrical valve exposed to the cylinder pressure and by this means we insure that the cylindrical valve is always kept in the desired position.

When a port 11 of the cylindrical valve 3 is in communication with the inlet port provided in the cylinder, the pressure of the gas therein is transferred through into the inside of the said valve and acts on the controller 12, pushing it away from that side of the cylindrical valve nearest the opening into the cylinder and to counteract this effect we preferably provide additional recesses 27 on the periphery of the controller into which recess or recesses oil under pressure is lead from the above mentioned recess or recesses formed in the housing by means of suitable holes 26 provided in the shell of the cylindrical valve.

We preferably provide a small piston 28 located in an opening in the walls of the cylinder which opening communicates in any suitable manner with the recess or recesses 25 whereby the pressure of the gas in the cylinder is transferred on to the oil provided for the purpose stated above.

Referring now to Figs. 12 and 13, we there show the manner in which the main valve may be used to determinate the point at which the supply of combustible mixture is arrested, while the controller or adjuster 12 is used to determine the point in the cycle at which exhaust is to take place. In explanation of this it will be seen, assuming the main valve 3 to be rotating in the direction of the arrow, cut-off is about to take place by reason of the edge of the port 11 closing over the edge of the passageway 7, so that no more mixture can enter the space 13. The flow into the cylinder from the space 13 takes place through another of the ports 11 as will be seen on reference to Fig. 12, and it will be obvious that when this latter port 11 completely passes the edge 20 of the controller 12, communication between the cylinder and the space 13 is closed but the closing in this instance is immaterial. On reference to Fig. 13 it will be seen that exhaust from the cylinder through the port 11 is about to take place since communication is then established between the cylinder and the space 14 of the controller, so that by slightly altering the position of the controller, the point at which exhaust commences can be varied, and this independent of the point at which the admission of the fresh charge to the cylinder takes place. This is a most important feature of the invention since it allows of a certain amount of control over the engine by means of the exhaust, and is a feature which, as far as we are aware, is novel.

It is to be understood that whereas we have described our improved valve mechanism only in connection with one engine cylinder, the said valve mechanism can be adapted to work in conjunction with a plurality of cylinders since all that is necessary is to form the continuously rotating valve and the adjuster of sufficient length, and to arrange the various slots and recesses appertaining to each part of the valve and adjuster adapted to operate in conjunction with the several cylinders of the engine, in proper relation to one another, or the above described arrangement can be duplicated into one complete valve mechanism used for each cylinder. Further it is to be understood that we do not desire to be limited to the exact details of arrangement and construction herein described, as the foregoing description is intended to indicate only a convenient manner in which our invention may be carried into effect, and hence it is desired that the same be not read in a limiting sense, as it is apparent to those skilled in the art that many alterations in arrangement and construction could be effected, without departing from the spirit and scope of the invention.

Having now described our invention, what we claim as new and desire to secure by Letters Patent is:—

1. An internal combustion engine comprising a cylinder, a housing thereon, a main valve adapted for continuous rotation within said housing, an adjustable controlling valve within said main valve, and means for adjusting the controlling valve into a number of positions, in certain of which positions compressed fluid is admitted to the engine for starting, while in other positions explosive mixture is admitted to the engine for normal running.

2. An internal combustion engine comprising a cylinder, a housing thereon, an apertured main valve adapted for continuous rotation mounted within the said housing, an adjustable controlling valve mounted within said main valve, said adjustable controlling valve having recesses adapted to register the apertures in the main valve and with a passageway admitting explosive mixture to the cylinder and also having recesses adapted to register with apertures in the main valve and with passageways in the housing for admitting compressed fluid to the cylinder.

3. An internal combustion engine comprising a cylinder, a housing thereon, a main valve adapted for rotation in said housing, an adjustable controlling valve within said main valve, a toothed pinion secured to one end of said controlling valve and a toothed rack carried in guides on the cylinder and gearing with the said toothed pinion.

4. An internal combustion engine comprising a cylinder, a housing thereon, an apertured main valve adapted for continuous rotation within said housing and an adjustable controlling valve mounted within said main valve, the said controlling valve having a recessed portion forming a passageway for explosion mixture, a second recessed portion, opposite the first mentioned recessed portion and forming the exhaust passage, and slotted portions on each side between the recessed portions, the slots in said slotted portions, when brought into register with apertures in the main valve and with passageways in the cylinder housing, permitting the passage of compressed fluid to the engine cylinder for starting in either direction.

5. An internal combustion engine comprising a cylinder, a housing thereon, a main valve adapted for continuous rotation within said housing, an adjustable controlling valve within said main valve, means for pressing the main valve on its seat, and means for pressing the controlling valve on its seat.

6. An internal combustion engine comprising a cylinder, a housing thereon, a main valve adapted for continuous rotation within said housing, an adjustable controlling valve within said main valve and recessed portions in said housing and said controlling valve communicating with an opening in the cylinder wall, whereby the pressure in the cylinder is communicated to the main valve and the controlling valve.

7. An internal combustion engine comprising a cylinder, a housing thereon, a main valve adapted for continuous rotation within said housing, an adjustable controlling valve within said main valve, recessed portions in said housing and said controlling valve communicating with an opening in the cylinder wall, and a piston working within the opening whereby the pressure in the cylinder is communicated to the main valve and controlling valve.

8. An internal combustion engine comprising a cylinder, a continuously rotating apertured main valve, a housing on said cylinder surrounding the main valve, said housing having a passageway for leading explosion mixture to the valve, an adjustable controlling valve mounted within said main valve, a recessed portion on the controlling valve adapted to register with an aperture in the main valve communicating with the inlet passage of the housing, said recessed portion also communicating with the cylinder through an aperture in the main valve during the admission period, a second recessed portion on the controlling valve, opposite the above mentioned recessed portion adapted to communicate with the cylinder through an aperture in the main valve during the exhaust period, and slotted portions at each side between the said recessed portions serving to permit of the introduction of compressed fluid to the cylinder for starting in either direction of rotation.

In testimony whereof we have signed our names to this specification in the presence of two subscribing witnesses.

JOSEPH ROTHCHILD.
JOHN BAXTER JARVIS.

Witnesses as to Joseph Rothchild:
JOHN A. PERCIVAL,
ALBERT E. PARKER.

Witnesses as to John Baxter Jarvis:
A. R. CHARLES,
H. W. BRADLEY.